United States Patent [19]

Nagano et al.

[11] Patent Number: 5,731,037
[45] Date of Patent: Mar. 24, 1998

[54] POLLUTION-PREVENTING PROCESS

[75] Inventors: Toshiaki Nagano; Tsutomu Maruyama; Atsushi Akiyama; Takeshi Tomiyama, all of Kanagawa-ken, Japan

[73] Assignee: Kansai Paint Co., Ltd., Amagasaki, Japan

[21] Appl. No.: 709,037

[22] Filed: Sep. 6, 1996

[30] Foreign Application Priority Data

| Sep. 6, 1995 | [JP] | Japan | 7-229327 |
| Sep. 6, 1995 | [JP] | Japan | 7-229470 |
| Sep. 4, 1996 | [JP] | Japan | 8-252254 |
| Sep. 4, 1996 | [JP] | Japan | 8-252255 |

[51] Int. Cl.$^6$ .............. B05D 1/38; B05D 7/06; B05D 3/02
[52] U.S. Cl. ............ 427/308; 427/387; 427/407.1
[58] Field of Search .................. 427/387, 393.4, 427/393.6, 407.1, 408, 317

[56] References Cited

U.S. PATENT DOCUMENTS

| Re. 30,909 | 4/1982 | Law et al. | 106/15.05 |
| 4,500,337 | 2/1985 | Young et al. | 106/15.05 |
| 4,962,156 | 10/1990 | Shinjo et al. | 525/100 |
| 5,064,613 | 11/1991 | Higgs et al. | 106/14.05 |
| 5,415,499 | 5/1995 | Hyde-Smith et al. | 427/373 |
| 5,492,730 | 2/1996 | Balaba et al. | 427/387 |
| 5,593,732 | 1/1997 | Griffith | 427/419.1 |
| 5,616,532 | 4/1997 | Heller et al. | 502/242 |

Primary Examiner—Diana Dudash
Attorney, Agent, or Firm—Fisher, Christen & Sabol

[57] ABSTRACT

A pollution-preventing process which comprises (i) controlling a surface moisture content of a first building material selected from the group consisting of an inorganic base material and wood at 0 to 20%, or (ii) coating a penetration-inhibiting primer onto a surface of a second building material having a surface moisture content of 10 to 100% and selected from the group consisting of an inorganic base material and wood to be dried, followed by coating a treating agent consisting of an organic solvent solution of a modified polysiloxane resin having a ladder structure onto a surface of the first building material or the second building material to impregnate the surface with the treating agent and by subjecting to curing treatment to prevent at least one pollutant selected from the group consisting of mold and moss from growing on the surface of the first building material or the second building material.

3 Claims, No Drawings

POLLUTION-PREVENTING PROCESS

BACKGROUND OF THE INVENTION (1) Filed of the Invention

The present invention relates to a pollution-preventing process for building materials.

(2) Description of the Background Art

The rain water causes to increase a water content of a building material such as an inorganic base material, wood or the like, resulting in that molds and mosses may easily grow on the building material in the shade or ill-ventilated areas. When molds and mosses have grown, mold fungi and mosses present within the pores in a porous surface of the building material in a large amount, resulting in making it extremely difficult to remove the fungi and mosses.

A prior art of removing the above molds and mosses proposes a process which comprises coating a dilute solution of oxalic acid or the like onto the above porous surface, followed by rubbing the coated porous surface by use of a brush or the like to remove the molds and mosses, and by removing an oxalic acid dilute solution adhered onto the porous surface with a clear water.

However, the above process has such drawbacks that it is impossible for the above process to sufficiently remove the fungi and mosses, and the fungi and moss may remain within the pores in the porous surface, resulting in that the remaining fungi and mosses may grow again with time.

SUMMARY OF THE INVENTION

It is an object of the present invention to provide a pollution-preventing process which is capable of effectively preventing pollutants such as molds and mosses from growing on the surface of the building material such as an inorganic base material, wood or the like. That is, the present invention provides a pollution-preventing process which comprises (i) controlling a surface moisture content of a first building material selected from the group consisting of an inorganic base material and wood at 0 to 20%, or (ii) coating a penetration-inhibiting primer onto a surface of a second building material having a surface moisture content of 10 to 100% and selected from the group consisting of an inorganic base material and wood to be dried, followed by coating a treating agent consisting of an organic solvent solution of a modified polysiloxane resin having a ladder structure onto a surface of the first building material or the second building material to impregnate the surface with the treating agent and by subjecting to curing treatment to prevent at least one pollutant selected from the group consisting of mold and moss from growing on the surface of the first building material or the second building material.

DETAILED DESCRIPTION OF THE INVENTION

The building material such as an inorganic base material, wood or the like as used in the present invention is such that it is necessary for the building material to form a rough finish with splits, to provide such a finish as not to show a feeling of being coated, or not to show a feeling of a coated film.

Preferable examples of the inorganic base material used in the first building material may include granite, marble, gran, andesite, tuff (Ohya stone), brick, slate, concrete, mortar, limestone and the like.

The first building material such as the inorganic base material, wood or the like as used in the present invention has a surface moisture content controlled at 0 to 20%, if needed, by applying hot air, dryer or the like.

A surface moisture content more than 20% undesirably results insufficient impregnation of the treating agent.

Preferable examples of the inorganic base material used in the second building material may include granite, marble, gran, andesite, tuff (Ohya stone), brick, slate, concrete, mortar, limestone, sandstone and the like.

The second building material such as the inorganic base material, wood or the like as in the present invention has a surface moisture content of 10 to 100%.

A surface moisture content less than 10% undesirably results in exhibiting wet color in appearance.

The surface moisture content used in the present invention represents a value measured by use of a concrete mortar high frequency capacity type moisture meter CO CO HI-500 (Trade name, marketed by Kett Co., Ltd.). Measurement of the surface moisture content by use of the above moisture meter is carried out as follows. A correlation between dielectric constant and moisture content for a mortar or concrete is determined in advance. Thereafter, a correlation between a high frequency capacity (C) and moisture content of the mortar or concrete is determined from the above correlation between dielectric constant and moisture content, and from a correlation between the capacity (C) and dielectric constant as represented by the following equation:

$$C = \epsilon \cdot K \text{ (Farad)}$$

where $\epsilon$ is a dielectric constant of a mortar or concreate containing moisture, K is a constant determined by a shape of a detector or electrode, and C represents capacity. Thus, the surface moisture constant is determined by measuring a frequency converted from a detected capacity of the mortar or concrete containing moisture, and is represented by percentage as a ratio of an amount of moisture to an amount of the mortar or concrete.

The penetration-inhibiting primer used in the present invention is selected from ones capable of preventing the treating agent consisting of the organic solvent solution of the modified polysiloxane resin from deeply penetrating into the second building material, and capable of forming a dry film, which is obtained therefrom by coating onto the second building material followed by drying and does not exhibit wet color in appearance.

The penetration-inhibiting primer may include a silane compound, a silane compound organic solvent solution, an acrylic aqueous dispersion, a polyvinyl chloride aqueous dispersion, a polyvinyl chloride organic solvent solution and the like.

Examples of the silane compound may include alkoxysilane compound, that is, (1) monoalkoxysilane such as methoxytrimethylsilane, methoxytriethylsilane, methoxymethyldiethylsilane, ethoxytrimethylsilane, ethoxytriethylsilane, ethoxytriphenylsilane, propoxytrimethylsilane, propoxytripropylsilane, butoxytributylsilane, phenoxytriphenylsilane and the like; (2) dialkoxysilane such as dimethoxydimethylsilane, dimethoxydiethylsilane, dimethoxydiphenylsilane, diethyoxydimethylsilane, diethoxydiethylsilane, diethyoxydiphenylsilane, dipropoxydimethylsilane, dipropoxydiethylsilane, dipropoxydipropylsilane, dipropoxydiphenylsilane, dibutoxydimethylsilane, dibutoxydiethylsilane, dibutoxydibutylsilane, dibutoxydiphenylsilane and the like; (3) trialkoxysilane such as trimethoxymethylsilane, trimethoxyethylsilane, trimethyoxypropylsilane, trimethoxybutylsilane, trimethoxyhexylsilane, trimethoxyphenylsilane, triethoxymethylsilane, triethoxyethylsilane, triethoxybutylsilane, triethoxyphenylsilane, tripropoxymethylsilane, tripropoxypropylsilane, tripropoxyphenylsilane, tributoxyphenylsilane and the like; and (4) tetraalkoxysilane such as tetramethoxysilane, tetraethoxysilane, tetrapropoxysilane, tetrabutoxysilane, dimethoxydiethoxysilane, tetraphenoxysilane and the like; vinyl group-containing silane compound such as vinyltriethoxysilane, vinyltrimethoxysilane, vinyltris(methoxyethoxy)silane, γ-methacryloyloxypropyltrimethoxysilane, 2-styrylethyltrimethoxysilane and the like; epoxy group-containing silane compound such as β-(3,4-epoxycyclohexyl)ethyltrimethoxysilane, γ-glycidoxypropyltrimethoxysilane, γ-glycidoxypropylmethyldiethoxysilane and the like; other silane compounds such as γ-mercaptopropyltrimethoxysilane, γ-mercaptopropylmethyldimethoxysilane, γ-chloropropyltrimethoxysilane, γ-chloropropylmethyldimethoxysilane, methyltrichlorosilane, dimethyldichlorosilane, trimethylchlorosilane and the like; and the like.

Of these, triealkoxysilane is preferred, and further the alkoxy group may preferably include lower alkoxy group such as methoxy, ethoxy and propoxy group.

Examples of the above organic solvent used in the primer may include alcohols such as methanol, ethanol and the like, ketones such as acetone, acetates such as butyl acetate, methoxypropyl acetate and the like, aromatic hydrocarbons such as xylene, toluene and the like.

The above primer is coated onto the surface of the second building material by the conventional process such as brushing, spray coating, dip coating or the like at a coating weight in the range of about 90 to 300 g/m², and is then dried by air-drying or by heating at a temperature of 200° C. or lower.

The treating agent used in the present invention is an organic solvent solution of a modified polysiloxane resin having a ladder structure.

Examples of the above organic solvent may include alcohols such as methanol, ethanol and the like, ketones such as acetone, acetates such as butyl acetate, methoxypropyl acetate and the like.

The modified polysiloxane resin is a higher organosilicon condensate, which has a ladder structure and is prepared by condensation of a tetrafunctional organosilicon compound and/or a trifunctional organosilicon compound.

More specifically, the higher organosilicon condensate as the modified polysiloxane resin may be prepared as follows.

That is, alkoxyl group in the tetrafunctional organosilicon compound and trifunctional organosilicon compound is hydrolyzed by water, followed by heating with agitation in the presence of water and a catalyst, resulting in making it possible to continuously carry out hydrolysis reaction and condensation reaction. An amount of the water used may not particularly be limited, but may preferably be 0.1 mol or more per one mol of alkoxyl group. When less than about 0.1 mol, a reaction therebetween may be reduced. Most preferably, water may be used in a large amount as a solvent. In the above reaction, a combined use of water with a water-soluble organic solvent makes it possible to homogenize the reaction system in the case where an alcohol hardly soluble in water is produced by condensation. Preferable examples of the above water-soluble organic solvent may include alcohols, esters, ethers, ketones and the like. The catalyst used in the above hydrolysis reaction may include an acid catalyst and an alkali catalyst. Examples of the acid catalyst may include hydrochloric acid, sulfuric acid, phosphoric acid, formic acid, acetic acid, propinonic acid, acrylic acid, methacrylic acid and the like. Examples of the alkali catalyst may include sodium hydroxide, triethylamine, ammonia and the like. The catalyst may preferably be used in an amount of 0.0001 to 5% by weight, preferably 0.01 to 0.1% by weight based on an amount of the above organosilicon compound.

Examples of the tetrafunctional organosilicon compound may include tetramethoxysilane, tetraethoxysilane and the like. Examples of the trifunctional organosilicon compound may include methyltrimethoxysilane, methyltriethoxysilane, phenyltrimethoxysilane and the like.

Specific examples of the above higher organosilicon condensate may include ones represented by the following general formula (I):

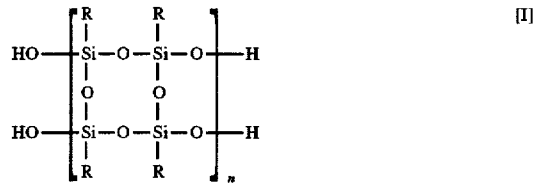

where R represents alkyl group having 1 to 4 carbon atoms or phenyl group, and n represents an integer of 30 to 80.

The treating agent used in the present invention is used in a solid content in the range of 2 to 10% by weight, preferably 3 to 6% by weight. A solid content less than 2% by weight results in making it impossible to obtain an intended pollution-preventing effect. A solid content more than 10% by weight undesirably results in exhibiting wet color in appearance and in causing unsatisfactory impregnation.

The treating agent may be coated by the conventional coating method such as brushing, spray coating, dip coating or the like at a coating weight of about 90 to 300 g/m² to be impregnated in a penetration depth of about 50 μm to 1 cm depending on kind and void of the inorganic base material and wood.

After the completion of the above coating, a curing treatment is followed. In the case where a basic catalyst is used, the curing treatment may be carried out at room temperature or advantageously by heat curing at 200° C. or lower. In the case where an acid catalyst in used, the curing treatment may be carried out by heat curing at a temperature around 200° C.

The present invention makes it possible to prevent molds, mosses, etc. from growing on the surface of the building material such as the inorganic base material, wood or the like by coating the treating agent comprising the modified polysiloxane resin onto a surface of a building material, a surface moisture content of which has been controlled at 0 to 20%, or onto a surface of a building material having a surface moisture content of 10 to 100% and pretreated by a process which comprises coating a penetration-inhibiting primer onto the surface of the building material and drying.

The present invention will be explained more in detail by the following Examples, in which "part" is by weight.

Treating Agent Preparation Examples 1–3

A reactor was charged with 187 parts of methyltrimethoxysilane and 187 parts of ethyl alcohol, followed by heating up to 80° C., adding 30 parts of 0.2N hydrochloric acid solution, reacting at 80° C. for 10 hours, adding 30 parts of triethylamine so as to increase a PH value to 7 or more, subjecting to condensation reaction at 80° C. for 2 hours to obtain a condensate having a n value of about 40 in the general formula (I), and by adding benzene in respective amounts so as to obtain transparent respective treating agents having a solid content of 3% by weight (Preparation Example 1), 6% by weight (Preparation Example 2) and 9% by weight (Preparation Example 3) respectively.

EXAMPLES 1-3

The above three treating agents having a solid content of 3% by weight (Example 1), 6% by weight (Example 2) and 9% by weight (Example 3) were coated by brushing onto a surface of a brick (length: 30 cm, width: 30 cm, thickness: 5 cm) having a surface moisture content of 17.6% to impregnate the surface with respective treating agents to a penetration depth of 20 mm respectively, followed by heat curing at 200° C. for 30 minutes. Appearance of the cured film was examined by the naked eye, and the results are shown in Table 1. Next, a mixture of five mold fungi, i.e. *Aspergillus niger, Cladosporium cladosporioides, Gliocladium virens, Penicillium funiculosum*, and *Aureobasidium pullulans* was planted onto the curing-treated surface of the brick respectively, followed by leaving to stand at 28° C. for 7 days to examine a mold hypha propagation area (%) and a color-changed area (%) with spores respectively. The mold hypha propagation area (%) and the color-changed area (%) with spores are represented by percentage based on the total area, i.e. 900 cm² of the brick. The results are shown in Table 1.

COMPARATIVE EXAMPLE 1

Example 1 was repeated except that a brick having a surface moisture content of 22% and the same size as in Example 1 was used. The results are shown in Table 1.

COMPARATIVE EXAMPLE 2

Example 2 was repeated except that a brick having a surface moisture content of 22% and the same size as in Example 2 was used. The results are shown in Table 1.

COMPARATIVE EXAMPLE 3

Example 3 was repeated except that a brick having a surface moisture content of 22% and the same size as in Example 3 was used.

The results are shown in Table 1.

COMPARATIVE EXAMPLE 4

Example 1 was repeated except that a solid content of the treating agent is 1% by weight. The results are shown in Table 1.

COMPARATIVE EXAMPLE 5

Example 1 was repeated except that a solid content of the treating agent is 15% by weight. The results are shown in Table 1.

EXAMPLES 4-6

Experiments were carried out in the same manner as in Examples 1-3 except that a penetration-inhibiting primer consisting of hexyltrimethoxysilane xylene solution having a solid content of 20% was coated onto a surface of an Ohya stone (length: 30 cm, width: 30 cm, thickness: 5 cm) having a surface moisture content of 24% to a coating weight of 300 g/m² to be dried, followed by coating three treating agents having a solid content of 3% by weight (Example 4), 6% by weight (Example 5) and 9% by weight (Example 6) onto the surface of the Ohya stone coated with the primer by brushing to impregnate the surface with respective treating agents to a penetration depth of 20 mm respectively, heat curing at 200° C. for 30 minutes. Appearance of the cured film was examined by the naked eye, and the results are shown in Table 1. Next, a mixture of five mold fungi as in Example 1 was planted onto the outing-treated surface of the Ohya stone respectively, followed by leaving at stand at 28° C. for 7 days to examine a mold hypha propagation area (%) and a color-changed area (%) with spores respectively. The mold hypha propagation area (%) and the color-changed area (%) with spores are represented by percentage based on the total area, i.e. 900 cm² of the Ohya stone. The results are shown in Table 1.

COMPARATIVE EXAMPLE 6

Example 4 was repeated except that an Ohya stone having a surface moisture content of 8% and the same size as in Example 4 was used. The results are shown in Table 1.

COMPARATIVE EXAMPLE 7

Example 5 was repeated except that an Ohya stone having a surface moisture content of 8% and the same size as in Example 5 was used. The results are shown in Table 1.

COMPARATIVE EXAMPLE 8

Example 6 was repeated except that an Ohya stone having a surface moisture content of 8% and the same size as in Example 6 was used. The results are shown in Table 1.

COMPARATIVE EXAMPLE 9

Example 4 was repeated except that a solid content of the treating agent is 1% by weight. The results are shown in Table 1.

COMPARATIVE EXAMPLE 10

Example 4 was repeated except that a solid content of the treating agent is 15% by weight. The results are shown in Table 1.

TABLE 1

|  | Development of Wet Color in Appearance | Mold Hypha Propagation Area (%) | Color-Changed Area (%) with Spores |
|---|---|---|---|
| Example 1 | None | 0 | 8 |
| Example 2 | None | 0 | 7 |
| Example 3 | None | 0 | 6 |
| Comparative Example 1 | None | 32 | 16 |
| Comparative Example 2 | None | 33 | 22 |
| Comparative Example 3 | None | 51 | 32 |
| Comparative Example 4 | None | 46 | 34 |
| Comparative Example 5 | developed | 50 | 35 |
| Example 4 | None | 0 | 5 |
| Example 5 | None | 0 | 4 |
| Example 6 | None | 0 | 4 |
| Comparative Example 6 | None | 20 | 13 |
| Comparative Example 7 | None | 26 | 18 |

TABLE 1-continued

|  | Development of Wet Color in Appearance | Mold Hypha Propagation Area (%) | Color-Changed Area (%) with Spores |
|---|---|---|---|
| Comparative Example 8 | None | 41 | 31 |
| Comparative Example 9 | None | 38 | 32 |
| Comparative Example 10 | developed | 56 | 34 |

What is claimed is:

1. A pollution-preventing process which comprises coating a primer selected from the group consisting of a silane compound, a silane compound organic solvent solution, an acrylic aqueous dispersion, a polyvinyl chloride aqueous dispersion and a polyvinyl chloride organic solvent solution, onto a surface of a building material having a surface moisture content of 10 to 100 percent and selected from the group consisting of an inorganic base material, wood and a porous material, followed by drying, coating a treating agent consisting of an organic solvent solution of a substituted polysiloxane resin having a ladder structure and having a solid content of 2 to 10 percent by weight to impregnate the surface with the treating agent and by subjecting to curing treatment to prevent at least one pollution-producing organism selected from the group consisting of mold and moss from growing on the surface of the building material, the primer preventing the treating agent from penetrating into the building material.

2. A process as claimed in claim 1, wherein the modified polysiloxane is a high organosilicon condensate prepared by condensation of at least one organosilicon compound selected from the group consisting of a tetrafunctional organosilicon compound and a trifunctional organosilicon compound.

3. A process as claimed in claim 1, wherein a solid content of the treating agent is in the range of 3 to 6% by weight.

* * * * *